(12) United States Patent
Wargo

(10) Patent No.: US 9,313,957 B2
(45) Date of Patent: Apr. 19, 2016

(54) ARRANGEMENT DEVICE

(76) Inventor: Christine Wargo, Dickson City, PA (US)

( * ) Notice: Subject to any disclaimer, the term of this patent is extended or adjusted under 35 U.S.C. 154(b) by 497 days.

(21) Appl. No.: 13/495,967

(22) Filed: Jun. 13, 2012

(65) Prior Publication Data
US 2013/0047502 A1 Feb. 28, 2013

Related U.S. Application Data

(63) Continuation-in-part of application No. 12/596,435, filed on Oct. 17, 2009, now abandoned.

(51) Int. Cl.
*A01G 5/00* (2006.01)
*A01G 5/04* (2006.01)

(52) U.S. Cl.
CPC ........................................ *A01G 5/04* (2013.01)

(58) Field of Classification Search
USPC .................................. 47/41.12, 41.13, 41.01
IPC ......................................... A01G 5/00; A47G 7/00
See application file for complete search history.

(56) References Cited

U.S. PATENT DOCUMENTS

| | | | | | |
|---|---|---|---|---|---|
| 485,417 | A | * | 11/1892 | Lord | 47/41.11 |
| 1,989,952 | A | * | 2/1935 | Thomas | 47/41.13 |
| 2,747,333 | A | * | 5/1956 | Erbguth | 47/41.13 |
| 3,131,511 | A | * | 5/1964 | Deaner | 47/41.01 |
| 3,158,524 | A | * | 11/1964 | Tong | 206/423 |
| 3,456,806 | A | * | 7/1969 | Borston | 211/60.1 |
| 3,745,702 | A | * | 7/1973 | Ogawa | 47/41.13 |
| 4,606,950 | A | * | 8/1986 | Corbet | 428/23 |
| 4,958,461 | A | * | 9/1990 | Aldrich | 47/41.01 |
| D507,602 | S | * | 7/2005 | Siegel | D19/85 |
| 7,036,668 | B2 | * | 5/2006 | Udy | 211/70.6 |
| D598,322 | S | * | 8/2009 | Kunz | D11/147 |
| 8,069,609 | B1 | * | 12/2011 | Towne et al. | 47/41.12 |
| 2005/0072044 | A1 | * | 4/2005 | Van Zuylen | 47/41.11 |
| 2005/0138861 | A1 | * | 6/2005 | O'Connor | 47/41.12 |
| 2005/0204618 | A1 | * | 9/2005 | Cardamone et al. | 47/41.13 |
| 2009/0307971 | A1 | * | 12/2009 | Driscoll | 47/41.13 |

FOREIGN PATENT DOCUMENTS

JP 2000051032 A * 2/2000 ............... A47G 7/02

* cited by examiner

*Primary Examiner* — Shadi Baniani
(74) *Attorney, Agent, or Firm* — Zale Patent Law, Inc.; Lawrence P. Zale

(57) ABSTRACT

The arrangement device includes a plurality of apertures in ring configuration. The apertures within each ring are tilted along a tangential angle with respect to the vertical. The apertures are uniquely defined and designed to receive specified stems of elongated items to be arranged. The apertures align the elongated items according to their tilt angles and are shaped to allow them to fall in a resting position approximating how the final arrangement will appear. The apertures have an inner wall angled allowing the elongated items to meet at a gathering point. They are gathered at a tie point and tied into a bouquet while each stem retains its tangential tilt. The arrangement device has legs allowing stems to be kept moist while using the arrangement device prior to being placed in their holding vessel. In an alternative embodiment, overlays may be added to identify items used in each aperture.

10 Claims, 5 Drawing Sheets

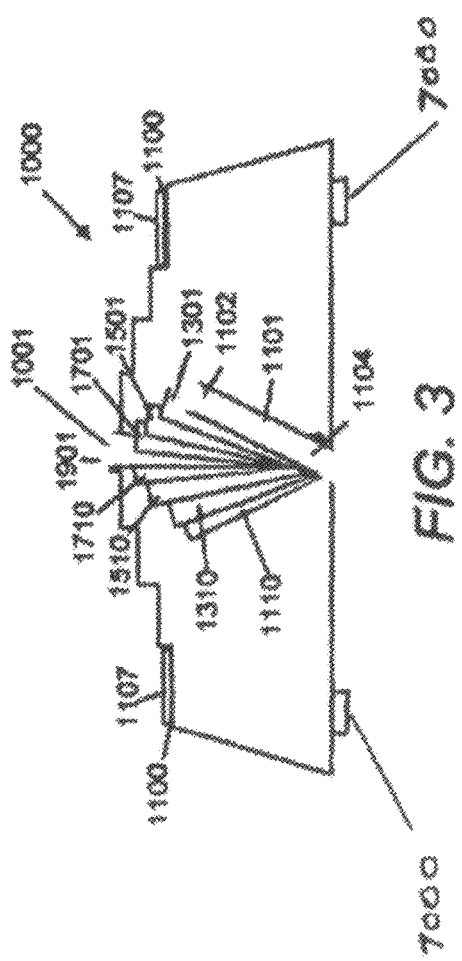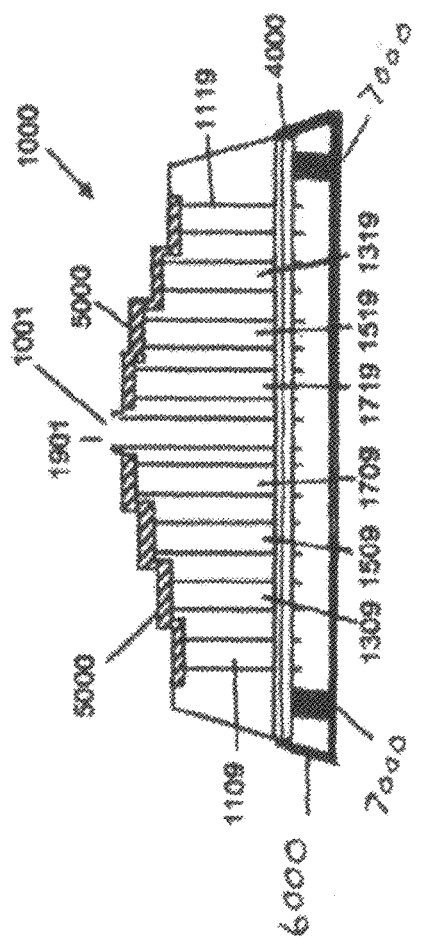

ARRANGEMENT DEVICE

This is a Continuation-in-Part of application Ser. No. 12/596,435 Filing Date: Oct. 17, 2009 now abandoned

CROSS REFERENCE TO RELATED APPLICATIONS

This application claims priority from U.S. Provisional Patent Application Ser. No. 61/001,504 "Arrangement Device" filed Nov. 1, 2007 by the same inventor as the present application, Christine Wargo.

FEDERAL SPONSORED RESEARCH

Not Applicable

SEQUENCE LISTING OR PROGRAM

Not Applicable

BACKGROUND OF THE INVENTION

1. Field of the Invention

The present invention relates to a device for arranging flowers and other aesthetic decorations.

2. Discussion of Related Art

Flower arrangement is a large business in the US and elsewhere. The selection of flowers and other vegetation, the angular and spatial separation and relative heights are important in providing an aesthetically pleasing product.

Also, it is important to be able to accurately produce the same arrangement repeatedly. It is also important to be able to accurately reproduce a given arrangement remotely at a different location. This would be important for national dealers of flowers which advertise and sell the flowers at one location which are intended to be sent to a recipient at another remote location. A floral shop near the recipient creates the arrangement and delivers it to the recipient. The delivered arrangement should look very similar to the one which the buyer bought.

Also, it is important to be able to cut the flower stem to size, visually eye the aesthetics and be able to adjust it if needed without the cut end of flowers drying out. This drying will start a natural sealing process of the stem and prohibiting the future intake of water, thus the flowers shelf life will be drastically shortened.

It is also important for one with little or no knowledge in floral art to be able to achieve an aesthetically pleasing arrangement. With the use of the aperture identifier the flowers can be cut to size and placed in the proper aperture achieving pleasing results.

Finally, it is important to be able to reproduce a given arrangement in a cost-effective manner. A device or tool which allows for rapid and consistent creation of an arrangement requiring little knowledge would be beneficial.

There are known devices for holding flowers and other similar arrangements described in U.S. Pat. No. 3,087,280 Sellinger, PCT/FR2002/003803 Lebreton et al., and U.S. Pat. No. 7,213,365 Van Zuylen.

Sellinger shows a very simple arrangement with one row of coils encircling a central wire coil. This is intended to hold arrangements, but does not act as a tool to insure consistent creation of arrangements.

Also, since it is constructed of wire coils, the stems are not easily inserted or extracted since leaves and protrusions on the stems get caught on the wire coils. These are designed to replace a vase.

The Lebreton patent application is designed for twisting the base of the flowers stems. There are no identifying marks of apertures and therefore it is not designed to provide for consistent reproducible arrangements. The base does not have legs allowing for liquid to fill the base of apertures thus the stems must be re-cut after the finished product for needed water intake.

U.S. Pat. No. 7,213,365 Van Zuylen describes a device for inserting flower stems in a grating to a bottom plate then twisting the stems to make an arrangement. Since the stems of flowers are placed through the grating to a bottom plate, and must be twisted, they are positioned in the grating vertically. If they were offset in various angles, they may become broken or tangled as they are twisted.

There are no means of keeping the stems moist during the creation of the flower arrangement.

There are no indications of identifying specific holes and therefore no way to exactly identify flower locations.

Currently, there is a current need for a device which acts as a tool to allow inexperienced users to quickly and efficiently produce quality arrangements with a high degree of accuracy and efficiency.

SUMMARY OF THE INVENTION

One embodiment of the present invention is an arrangement device 1000 for creating aesthetic arrangements comprising:

a) a plurality of apertures for receiving elongated items intended to be arranged, with respect for the vertical, each aperture is arranged in a predefined tangential angle using the center tubular shape aperture as it's axis;

b) an identification code to uniquely identify each aperture;

c) instructions indicating the contents of each aperture;

d) leg risers allowing liquids into aperture bases.

The arrangement device may also be embodied wherein the apertures are arranged in a plurality of rings having overlays providing instructions as to what is to be placed in each aperture.

OBJECTS OF THE INVENTION

It is an object of the present invention to provide a decorative arrangement device which aids in creating arrangements in a pre-defined manner.

It is another object of the present invention to provide a decorative arrangement device which aids in creating arrangements repeatedly in a pre-defined manner.

It is another object of the present invention to provide a decorative arrangement device which directs a user to create arrangements in a predefined manner allowing for various shapes and sizes.

It is another object of the present invention to provide a decorative arrangement device which arranges flowers for use as a hand-held bouquet without the use of a vase.

It is another object of the present invention to provide a decorative arrangement device which allows one to create specific arrangements at a remote location.

It is another object of the present invention to provide a decorative arrangement device which allows one to create numerous arrangement in a cost-efficient manner.

It is another object of the present invention to provide a decorative arrangement device which allows one to create arrangements with the stem ends of flowers being arranged immersed in a liquid such as water.

It is another object of the present invention to provide a decorative arrangement device which allows one to create dry arrangements without the use of water.

It is another object of the present invention to provide a decorative arrangement device which allows one to pre-design arrangements for use in various shapes and sizes of various containers or vases.

It is another object of the present invention to provide a decorative arrangement device which allows one ease of time while creating fresh floral arrangements.

BRIEF DESCRIPTION OF THE DRAWINGS

The advantages of the instant disclosure will become more apparent when read with the specification and the drawings, wherein:

FIG. 3 is a partial side elevational view of a single row of apertures of the arrangement device of FIGS. 1, 2 as viewed 90 degrees away from the view of FIG. 2.

FIG. 4 is a cross-sectional view of another embodiment of the arrangement device according to the present invention.

DETAILED DESCRIPTION OF THE INVENTION

Figure 1:
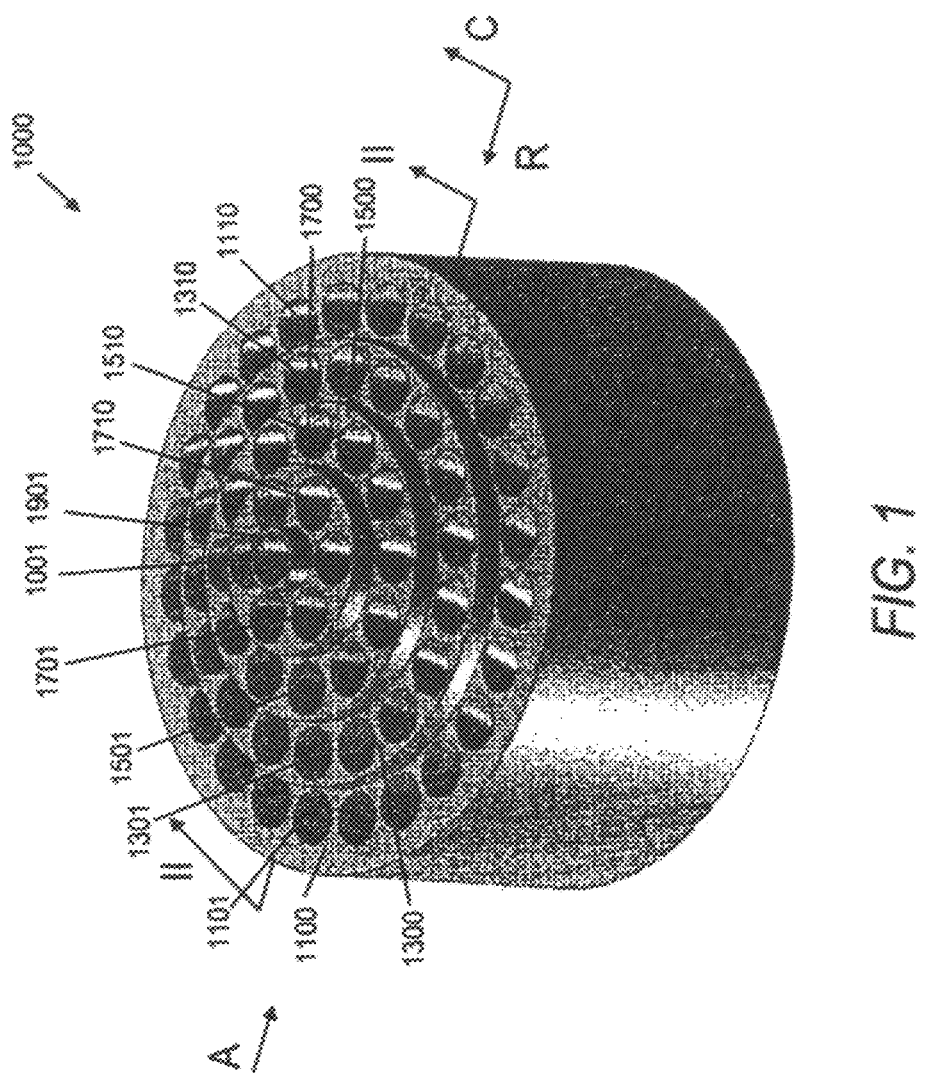
FIG. 1 is a perspective view of one embodiment of the arrangement device according to the present invention.

FIG. 1 is a perspective view of one embodiment of the arrangement device according to the present invention.

Arrangement device 1000 has a plurality of apertures for receiving items intended to be arranged which may be flowers, vegetation, or other elongated aesthetically pleasing items. The embodiment described below relates to arranging flowers and related items collectively referred to as "flowers". However, it is to be understood that this arrangement device works well to arrange other elongated items arranged for ornamental purposes.

Also, please note that the embodiment shown has radial symmetry, but may be a number of other shapes which all fall under the spirit of the invention.

Arrangement device 1000 employs a plurality of apertures for receiving the stems of the flowers. In this embodiment, these apertures are arranged in concentric rings where apertures 1101, 1110 are in ring 1100, apertures 1301, 1310 are in ring 1300, apertures 1501, 1510 are in ring 1500, apertures 1701, 1710 are in ring 1700 and 1901 is a center aperture. In this embodiment, each ring is slightly higher moving toward center aperture 1001 of arrangement device 1000. However, other embodiments having different geometries are possible which fall under the spirit of the invention.

It is understood that the apertures may be packed in other ways which are not rings.

In a preferred embodiment, each of the apertures is given a unique identifier such that the contents of each may be individually specified.

The stems of flowers are inserted into the apertures according to a pre-determined design. Since each aperture may be marked with a unique identification number, the contents of each aperture may be uniquely identified in a set of instructions for a given bouquet.

The location of each flower head is a function of the angle of the aperture in which it was placed and the length of the stem.

Each aperture is positioned to have its top end tilt in a direction following a circle around center axis 1001 relative to the vertical. This will be referred to as a "tangential tilt". The tangential tilt adds a more professional look to bouquets.

The arrow marked "C" indicates the tangential direction, being a direction along a circle centered on center point 1001.

The arrow marked by the letter "R" indicates a radial direction.

Each aperture is also shaped to allow the stems and flowers to lean away from the center 1001 during arrangement, to a maximum leaning angle, but toward the center 1001 to another maximum angle when being tied, without losing the tangential tilt.

Figure 2:
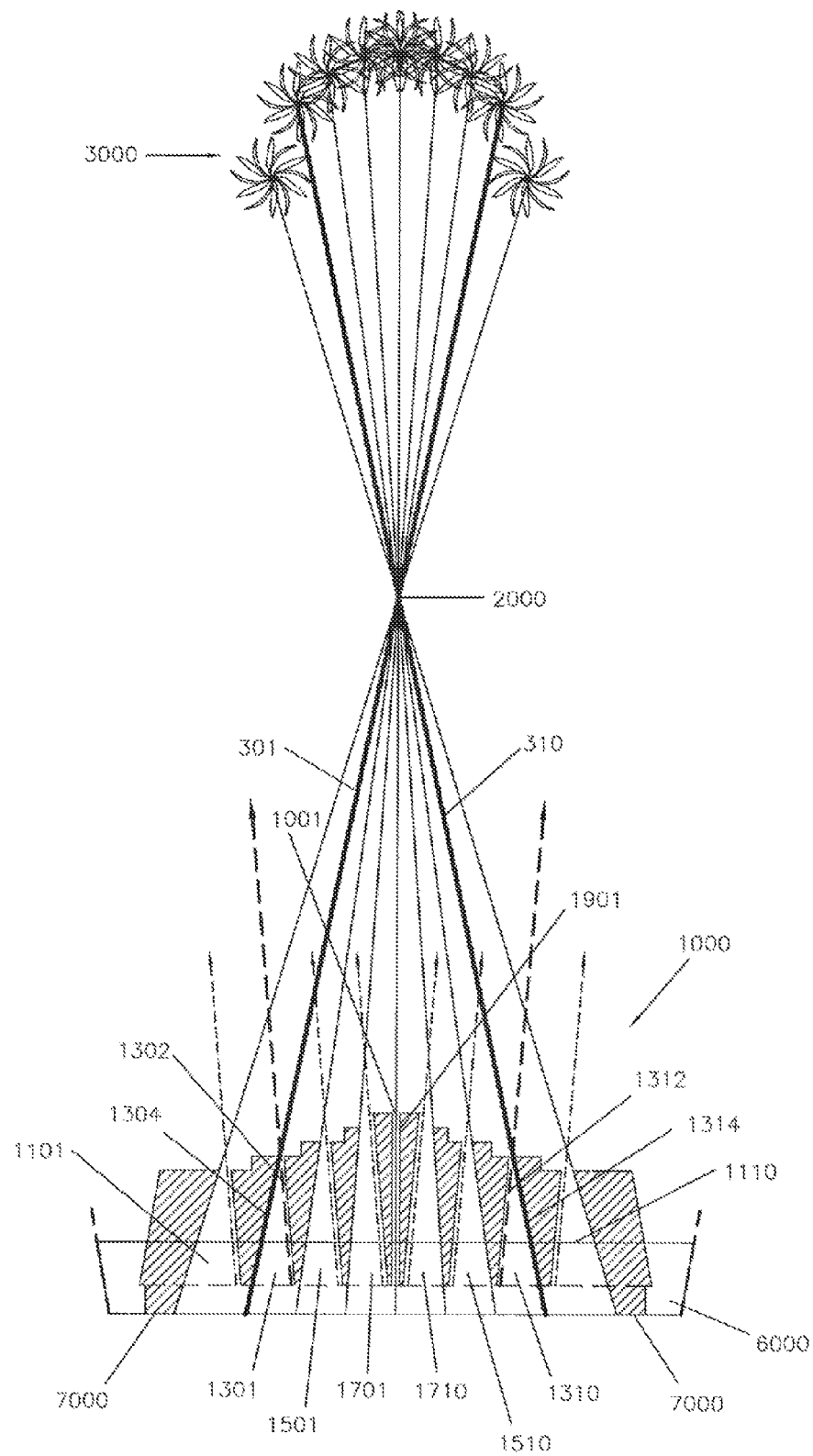
FIG. 2 is a side cross-sectional view of the arrangement device of FIG. 1 indicating how flower stems would be arranged in the device.

FIG. 2 is cross-sectional, side elevational view of the arrangement device of FIG. 1.

Since this is a side view of a row of apertures, the tangential tilt out of the page toward the reader for apertures 1101, 1301, 1501, 1701 on the left is not visible. Similarly, the tangential tilt of apertures 1710, 1510, 1310, 1110 into the page and away from the reader are also not visible.

Apertures 1101, 1301, 1501, 1701, 1710, 1510, 1310, 1110 in this embodiment are shaped having a wider base side and a narrower top side in this view. Center aperture 1901 may have a cylindrical shape.

These apertures may extend through the entire arrangement device 1000 or only partially extend through it.

Take, for example, apertures 1301, 1310. During arrangement of the flowers, a stem 301 indicated by the thickened dashed line, is placed in aperture 1301 and a stem 310 also indicated by a thickened dashed line, is placed in aperture 1310. The flower tops (not shown) are allowed to fall under their natural weight radially outward from center 1001 where the stems rest on inner surfaces 1302, 1312, respectively at their maximum outward angle. This allows a user to get an indication of the relative spacing of the flower heads, their angular positions and how a bouquet 3000 will look when finished.

After the stems are placed in the proper apertures, they are gathered at a tie point 2000. The stems are gathered keeping approximately the same tangential angle, however, the stems 301, 310 will now move from their resting position against the inner surfaces 1302, 1312 to the outer surfaces 1304, 1314, respectively, to their maximum inward angle. This causes a twisting motion to flower tops as they are bundled. After elongated items are bundled, they are positioned as shown.

The outer surfaces 1304, 1314 are preferably angled to point to the tie point 2000.

Therefore, stems are allowed to tilt in a radial from their resting positions to the tie point 2000; however, they are restrained to retain their same tangential tilt. Each stem will have the same directional tangential tilt in each concentric ring which gives the bouquet 3000 a more professional look.

The arrangement device 1000 is made of a material which allows it to be placed in a container 6000 having water so that the stems may be kept moist during prolonged creation of the arrangement.

The arrangement device has legs 7000 that allows water from container 6000 to flow into the base of the apertures keeping fresh cut flower stems moist.

The present invention therefore is a significant advancement over prior art. It allows one with little or no floral experience to follow patterns and the luxury of time when creating a floral design by having the stem ends placed in water, hindering the natural process of sealing which occurs when the stems are allowed to dry. As a result of these cut stem ends being held in water and not sealed, there is no need to re-cut the ends before placing them in a vase and this adds a longer shelf life to the flowers.

FIG. 3 is a partial side elevational view of a few tubes of the arrangement device of FIG. 1 as viewed 90 degrees away from the view of FIG. 2. The view for FIG. 3 is along the arrow marked "A" in FIG. 1.

Aperture 1001 is a vertical aperture with apertures 1101, 1301, 1501, 1701, 1901, 1710, 1510, 1310, 1110 using it as their axis.

Apertures 1101, 1301, 1501, 1701, 1901, 1710, 1510, 1310, are arranged in concentric rings with respect to the vertical and are shown eclipsing each other. This shows how each aperture has the top of the aperture tilting in the same tangential direction (a "twist angle") around the perimeter of arrangement device 1000. In this embodiment each ring has progressively less of a twist angle moving from ring 1100 to center point 1001.

The arrangement device 1000 will now be described in connection with FIGS. 1, 2 and 3. The arrangement device 1000 is preferably constructed having the desired number of apertures arranged in multiple rings 1100, 1300, 1500, 1700. Preferably, each aperture is angled in a tangential angle along the arrow marked "C" of FIG. 1, around the circumference of the device.

The stems are then removed from arrangement device 1000 to result in a final bouquet 3000 having the proper angular arrangement. The oval or elongated bottom of the apertures allows for easier removal of the bouquet once it has been tied.

In order to more specifically define a bouquet, overlays may be employed and placed on top of rings 1100, 1300, 1500, 1700. In this embodiment, they would be overlays having holes which line up with the apertures. In this embodiment, these will be flat and ring-shaped.

The ring has an additional hole to fit with a protrusion to allow the ring to fit only in one specific way.

In FIG. 3 an overlay 1107 is shown in cross section resting upon ring 1100.

Each overlay is specific to a given bouquet or bouquets. Each has an indication at each aperture of the type of flower which is to be placed into this aperture, or if there is to be nothing placed in this aperture. In some cases, apertures may be covered to indicate that they are not used for a given bouquet. Other information may be indicated, such as the preferred length of the stem. Also, a color may be identified to show the color of the flower to be used in this aperture.

This results in an exact identification of an arrangement specifying the flower types, the locations in which they are placed, the proper radial angles, the proper tangential angles and the spacing.

By using the same arrangement device 1000 at a remote location with the same overlays, one may almost exactly reproduce a given arrangement.

In another embodiment, the apertures may be identified by a unique code. This may for example be by ring number and clock position or other encoding. Once defined, instructions may be made using these codes for defining a universal method of identifying flowers to exactly reproduce a given arrangement. This, theoretically, can be done by using the arrangement device 1000 and defined codes without the necessity of seeing the original arrangement. This would be useful for floral wire services for remote processing and delivery of a floral arrangement.

This allows a remote user to create almost the exact bouquets as the models at the base location. This is very important to teleflorists.

Teleflorists typically show a model arrangement or a picture of one at a base location. The customer would like the same arrangement as the model delivered to a recipient at a remote location. The florist at the remote location, using the present invention and the instructions for a given bouquet, can easily create the same bouquet at the remote location.

FIG. 4 is a side elevational view of another embodiment of the present invention. In this embodiment, container 6000, legs 7000, each of the apertures is constructed as a tube 1109, 1309, 1509, 1709, 1719, 1519, 1319, 1119 having a lower end which fits into a base plate 4000. The upper end of each tube then fits into a rotation plate 4000. Rotation plate 5000 is allowed to rotate about the center point 1001 for a limited amount. Therefore, the tangential angle of the tubes may be set for creating unique arrangements.

The present invention may also include instructions for bouquets in which defined flowers are designated to be placed in apertures which are designated by the overlays, or imprinted upon the arrangement device 1000 itself. The overlay or the arrangement device may also have colors in the instructions or on the overlay near each aperture indicating the color of the flower which will be inserted in the aperture. Therefore, the device may be realized as an instructional device for allowing an inexperienced person to exactly create a specific bouquet accurately and efficiently.

In the embodiment of FIG. 4, the tubes may be color coded to indicate the color of a flower to be inserted into the tube.

In still another embodiment, the apertures or tubes could be cylindrical shaped with a cylindrical diameter large enough to allow the flowers to fall into the resting position, then allowing the stems to be gathered at the tie point 2000. This embodiment is less effective and does not function as well as the preferred embodiment.

In still another embodiment, apertures/tubes further from the center allow the flowers to tilt radically outward further than the apertures/tubes closer to the center.

Figure 5:
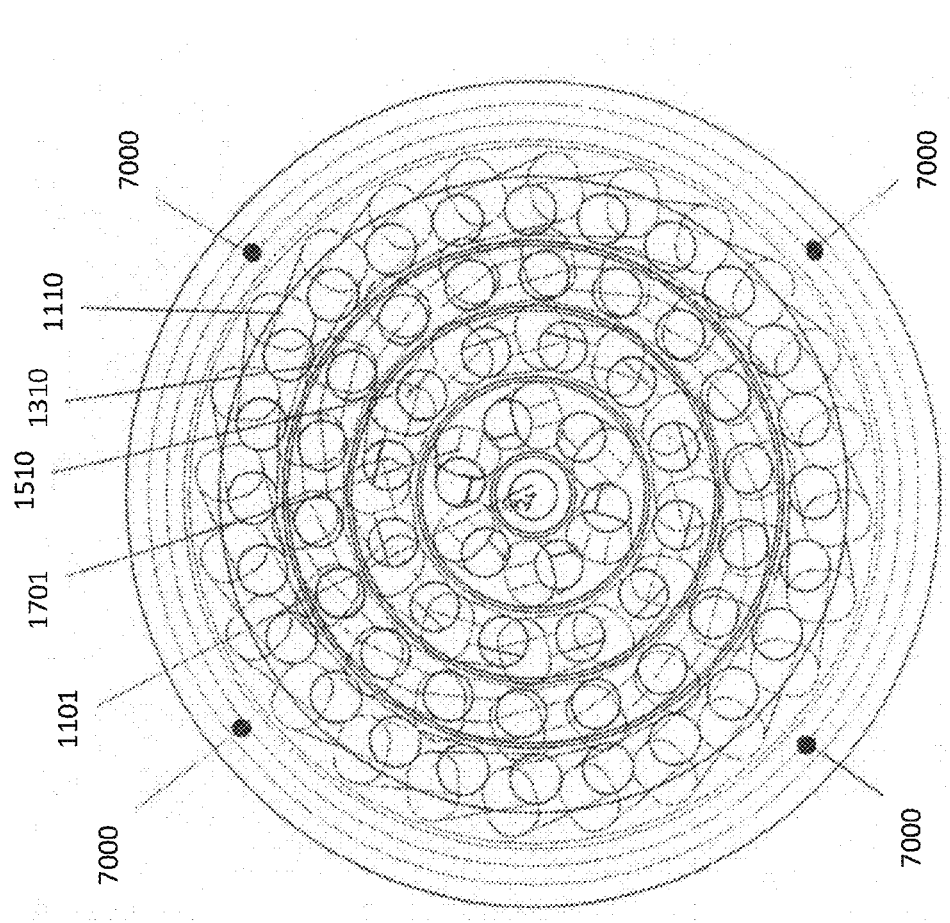
FIG. 5 is a bottom view of one embodiment of the arrangement device showing the legs according to the present invention.
Figure 6:
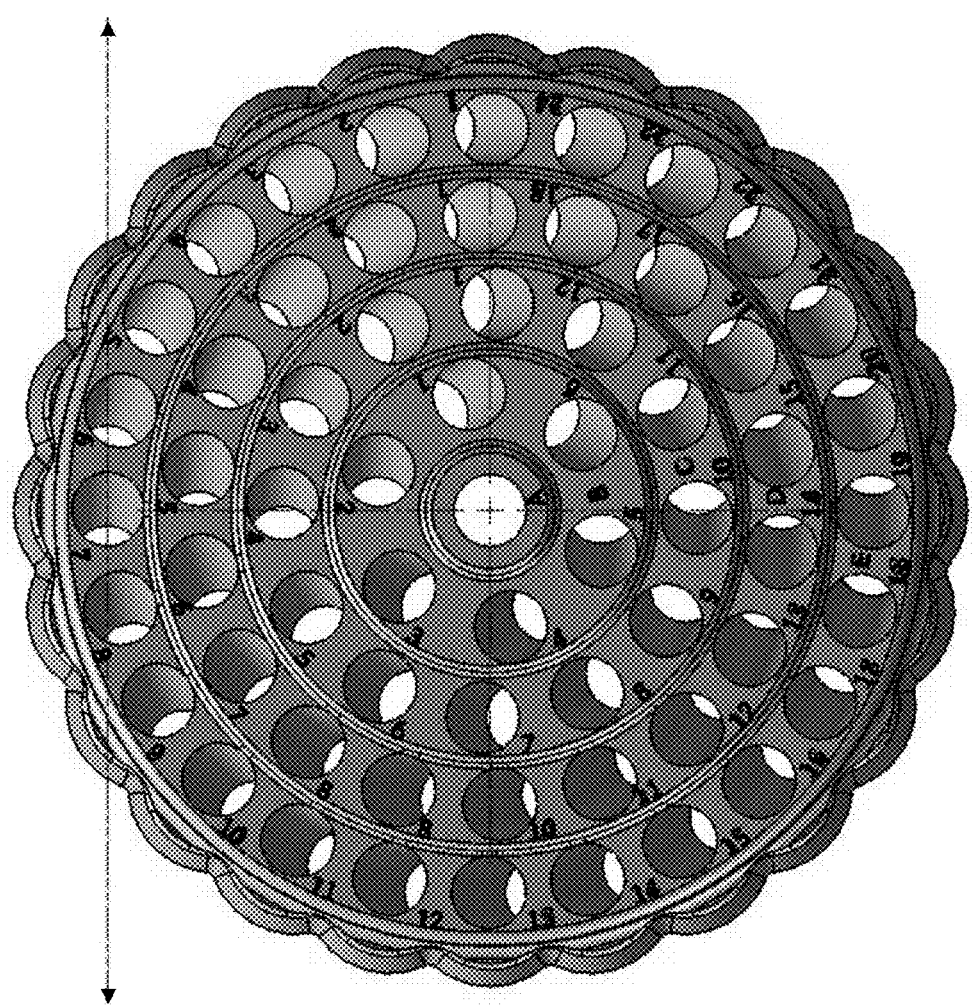
FIG. 6 is a plan view of the arrangement device according to the present invention.

FIG. 5 is the bottom view of device 1000. This shows legs 7000 which raises the base of device 1000 allowing a gap for liquid to flow into the bottom of the apertures.

The present invention therefore is a significant advancement over the prior art. It allows flower arrangements to be constructed in a specified manner with little or no ambiguity. Exact bouquets can be created and reproduced in an efficient and accurate manner by those with little experience in floral arrangement.

The present invention is also a significant advancement over the prior art in that the cut ends of fresh flowers are held in water allowing one with little or no experience in the art of flower arranging time to create, move or change the placement of flowers without the natural sealing process on the cut end of the stems to occur inhibiting their further intake of water.

Professional results are accomplished with little experience or knowledge required by the user. It can also provide the same bouquet repeatedly with little variation making it very reproducible.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. An arrangement tool that creates a bouquet from a plurality of elongated items comprising:

a center point at an approximate center of the arrangement tool; and a plurality of tubular shaped structures arranged in concentric rings from an innermost ring proximate the center point to an outermost ring farthest from the center point;

each ring comprises a plurality of tubular shaped structures, all tilted in the same tangential direction;

all tubular shaped structures within said each ring are tilted with the same tangential angle;

wherein the tangential angle increases moving from the innermost ring to the outermost ring;

each of the plurality of tubular shaped structures are sized, shaped and angled to receive an elongated item and to allow for unrestricted insertion and withdrawal of the elongated items;

the size, shape and angle of the tubular shaped structures, allows the elongated items to be tied together and withdrawn from the tool, each of the elongated objects retaining the tangential tilt of the tubular shaped structure from which it was withdrawn creating a multi-tier arrangement where each tier retains the tangential angle of the ring from which it was withdrawn, which a progressively more angled moving form an inner tier to an outer tier creating an aesthetically-pleasing bouquet; and at least one leg on the arrangement device extending below the arrangement tool, holding the arrangement tool above a surface and allowing for water to flow underneath it.

2. The arrangement tool of claim 1 wherein at least two of the plurality of tubular shaped structures have a diameter large enough relative to that of the elongated items to allow the elongated items to lean away from the center point at a first radial angle and have a tangential angle around the axis of the center point when the elongated items are not tied together, but when the elongated items are tied together have the same tangential angle but now has a second radial angle that is between the first radial angle and a vertical line.

3. The arrangement device of claim 1 further comprising: a tubular shaped structure at the center point.

4. The arrangement tool of claim 1 wherein at least one tubular shaped structure of the plurality of tubular shaped structures extends through the entire arrangement tool.

5. The arrangement tool of claim 1 wherein at least one tubular shaped structure of the plurality of tubular shaped structures is identifiable.

6. The arrangement tool of claim 1 wherein at least a portion of the arrangement tool is made of material which allows it to be placed in a container of water.

7. The arrangement tool of claim 1 wherein the at least one leg creates a gap under the arrangement tool which can receive a liquid.

8. The arrangement tool of claim 1 wherein the identifier is an overlay that identifies each tubular shaped structure thereby allowing different elongated items to be placed in identified tubular shaped structures to result in at least one predetermined arrangement.

9. An arrangement tool for creating bouquets from a plurality of elongated items comprising:

a plurality of tubular shaped structures each sized and shaped to receive one or more elongated items, and each tilted at a tangential angle from a vertical, arranged in a plurality of concentric rings from an innermost ring proximate a center point of the arrangement tool to an outermost ring farthest from the center point;

wherein the tangential angle of the tubular structures are the same for each ring, and the tangential angle of the tubular structures increases moving from the innermost ring to the outermost ring;

wherein the tubular shaped structures are sized to allow tying of the elongated items and removal of the elongated items such that each retains the angle and placement of the tubular shaped structure from which it is removed creating a bouquet being a multiple tier arrangement of the elongated items iii which each tier pertains to a concentric ring and the tangential angle of each elongated item pertains to the tangential angle of the tubular shaped structure from which it was removed.

10. The arrangement tool of claim 1, wherein the tubular shaped structures are sized to allow unrestricted insertion and removal of the elongated objects.

* * * * *